United States Patent
Lu et al.

(10) Patent No.: US 6,469,800 B1
(45) Date of Patent: Oct. 22, 2002

(54) METHOD FOR CONVERTING VERTICAL RESOLUTIONS TO PRINTER-BASED RESOLUTIONS

(75) Inventors: Ai-Chieh Lu, Yung Ho; Fong Lien, Taipei, both of (TW)

(73) Assignee: Destiny Technology Corporation, Taipei (TW)

( * ) Notice: Subject to any disclaimer, the term of this patent is extended or adjusted under 35 U.S.C. 154(b) by 0 days.

(21) Appl. No.: 09/454,546

(22) Filed: Dec. 7, 1999

(51) Int. Cl.[7] ............................................... G06F 15/00
(52) U.S. Cl. .................. 358/1.2; 382/298; 382/299; 382/300; 358/1.9; 345/3.3
(58) Field of Search .................. 358/1.2, 1.9; 382/298, 382/299, 300; 345/698, 699, 3.3

(56) References Cited

U.S. PATENT DOCUMENTS

| | | | | |
|---|---|---|---|---|
| 4,644,409 A | * | 2/1987 | Fuchs | 358/443 |
| 4,841,375 A | * | 6/1989 | Nakajima et al. | 358/442 |
| 5,706,369 A | * | 1/1998 | Wang et al. | 358/445 |
| 5,732,196 A | * | 3/1998 | Watanabe | 358/1.15 |
| 5,764,816 A | * | 6/1998 | Kohno et al. | 358/448 |
| 5,872,636 A | * | 2/1999 | Kohtani et al. | 358/1.9 |
| 6,289,137 B1 | * | 9/2001 | Sugiyama et al. | 358/451 |
| 6,317,802 B1 | * | 11/2001 | Inamine | 101/128.4 |

* cited by examiner

*Primary Examiner*—Edward Coles
*Assistant Examiner*—Iraj Rahimi
(74) *Attorney, Agent, or Firm*—Powell, Goldstein, Frazer & Murphy LLP

(57) ABSTRACT

A method for converting a facsimile-based vertical resolution to a printer-based vertical resolution is disclosed. The printer-based vertical resolution is firstly divided by using the facsimile-based vertical resolution to obtain a quotient and a remainder both being integers. All the data lines of the printing job are repeatedly generated for "quotient" times. Next, some data lines that their total number equals to the remainder are selected from the repeatedly data lines for further generated once than the other is. The selected data lines can be randomly or fixed selected from the data lines.

19 Claims, 5 Drawing Sheets

The 12$^{th}$, 24$^{th}$, 36$^{th}$, 60$^{th}$, 72$^{th}$, and 84$^{th}$ lines are each duplicated for 4 times, while other lines for 3 times.

METHOD FOR CONVERTING VERTICAL RESOLUTIONS TO PRINTER-BASED RESOLUTIONS

CROSS REFERENCE TO RELATED APPLICATION

The invention is related to another U.S. patent application entitled "SYSTEM AND METHOD OF CONVERTING HORIZONTAL RESOLUTIONS FOR PRINTERS" assigned to same assignee as the present application and incorporated herein by reference in its entirety.

BACKGROUND OF THE INVENTION

1. Field of the Invention

The present invention relates to a method for resolution conversion and, more particularly, to a method of conversion of a facsimile-based resolution to a printer-based resolution in the vertical direction.

2. Description of the Prior Art

Digital image processing technology has been being pushed by the incessant demands from the highly developed electronic devices, such as scanners, printers, facsimiles, digital cameras, and the like. The development of digital image process makes pictorial webs possible and further facilitates people in managing image files or documents both through the Internet and on office work. Printers are well-known devices for producing copies from PCs, facsimile or fax machines, and typically, image signals used for facsimiles and printers are respectively formatted on a pixel/mm and dot-per-inch (dpi) basis. In making a copy based on image signals of a facsimile via a printer engine, it is inevitable to sacrifice some image signals or to duplicate some image signals due to the different formats employed.

For an 8×3.85 pixels/mm, which is equivalent of 203.2×97.8 dpi, of a formatted facsimile signal, both the vertical and horizontal resolutions need to be converted to, for example, 300 dpi. For this, duplication must be adopted to achieve the resolution conversion. In a prior art, 203.2×97.8 dpi is converted to 300×300 dpi by two stages. In the first stage, 203.2×97.8 is converted to 200×100 dpi, wherein duplication is used; and then converted to 300×300 dpi referred to as the second stage. In the first stage, two lines, for example, the $49^{th}$ and $98^{th}$ lines are added for every 98 lines in the vertical direction by means of software conventionally, and 3 dots are deleted in the horizontal direction from every 203 dots so that a resolution of 200×100 dpi is achieved. When 100 dpi is converted to 300 dpi in the second stage via hardware implementation such as an ASIC, there need some duplications in the vertical direction. To map the 100 lines in an inch range into 300 lines per inch, each of the 100 lines needs to be duplicated for two times. Consequently, the $49^{th}$ line and the $98^{th}$ line of the 98 lines in an inch are respectively drawn for six times, but other lines are just drawn for 3 times. FIG. 1 shows the aforementioned two stage conversions, wherein the original image 102 is generated from a facsimile machine, and the images 104 and 106 are respectively derived from the first and second stages. Therefore, in this scheme for conversion of vertical resolution from a facsimile-based signal format to a printer-based signal format, the errors are significantly amplified and hence a non-realistic image is provided. Worse yet, the errors are oddly distributed throughout a piece of paper.

SUMMARY OF THE INVENTION

The principal object of the present invention is to disclose a method of resolution conversion for more evenly distributed errors in the vertical direction.

According to the above object, the first embodiment of the disclosed method divides the printer-based vertical resolution by the facsimile-based vertical resolution to obtain a quotient and a remainder, both being integers. Some data lines of the printing job formatted on the facsimile-based resolution, in which their total number is equal to the remainder, are selected for the purpose of being generated one more time than the others. All the data lines are then repeatedly generated for "quotient" times except those selected ones, which are generated for "quotient+1" times. The selected data lines can be randomly or fixedly selected.

According to the second embodiment, the disclosed method also divides the printer-based vertical resolution by the facsimile-based vertical resolution to obtain a quotient and a remainder both integers, too. All the data lines are repeatedly generated for "quotient" times. Next, some data lines that their total number equals to the remainder are selected from the repeated data lines in order to be repeated once more than the other ones. As same as the first embodiment, the selected data lines can be randomly or fixedly selected from the repeated data lines.

BRIEF DESCRIPTION OF THE DRAWINGS

In order that the invention may be more clearly understood, it will now be disclosed in greater detail when taken in conjunction with the accompanying drawings, wherein.

DESCRIPTION OF THE PREFERRED EMBODIMENT

According to the embodiments of the present invention, a conversion of resolution in the vertical direction from a facsimile-based resolution to printer-based resolution is disclosed.

Figure 1:
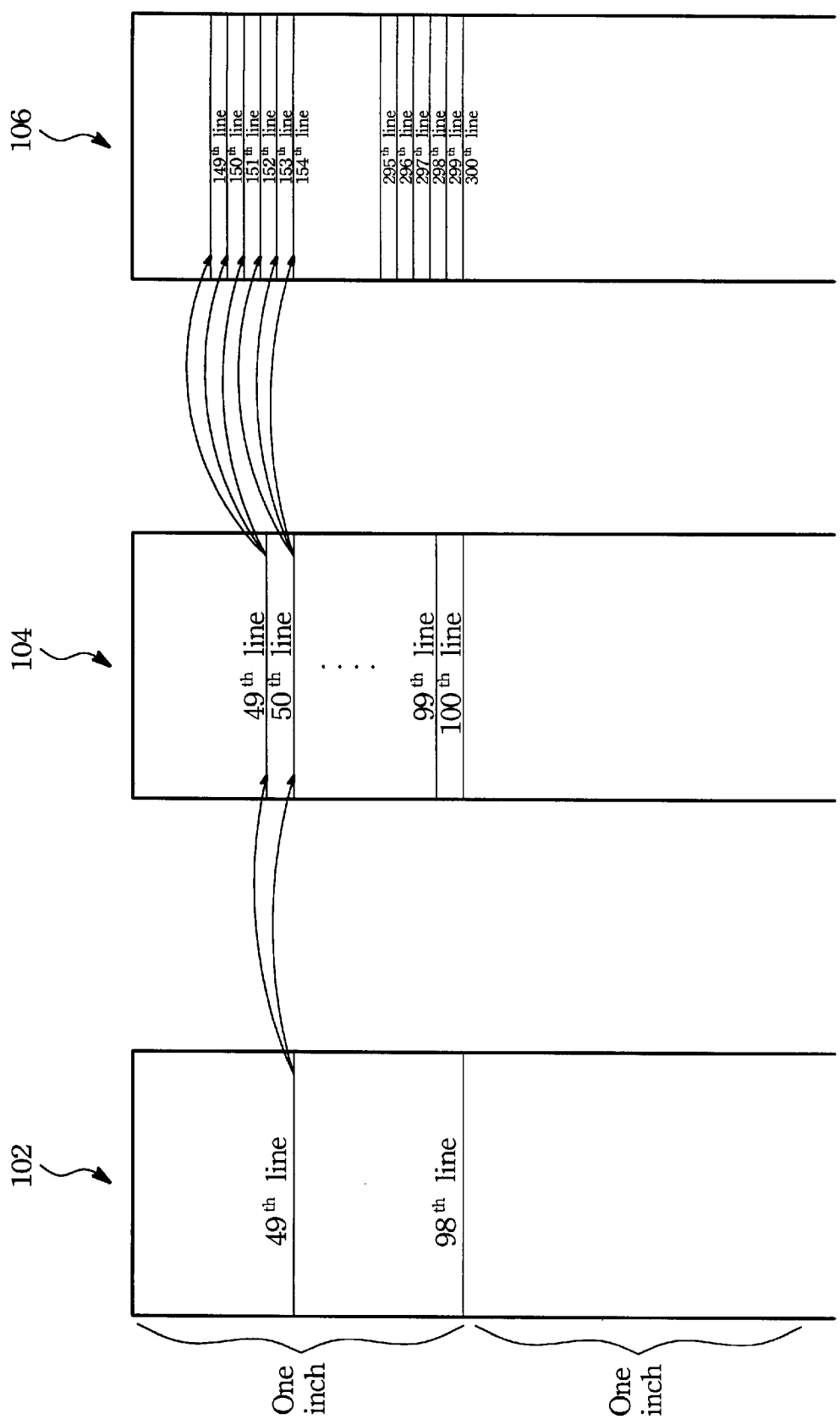
FIG. 1 is a diagram illustrating the duplicating process in the vertical direction for a printing action requested from a facsimile signal in the prior art.
Figure 2:
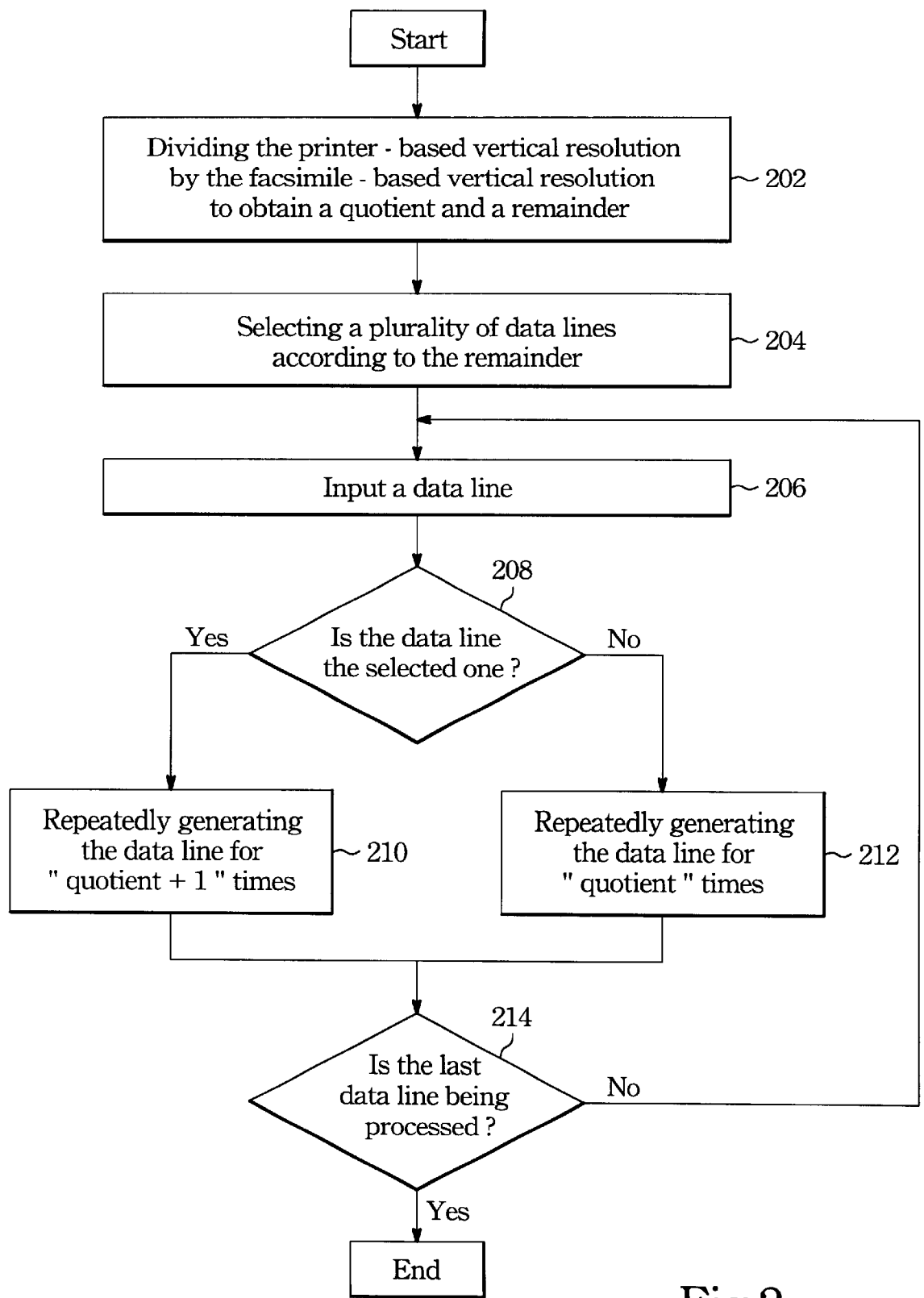
FIG. 2 is a flow diagram representative of the first embodiment of the printing method according to the present invention.

Referring to FIG. 2, a flow diagram illustrative of the first embodiment of the disclosed method is shown therein. At first in the block 202, the printer-based vertical resolution is divided by the facsimile-based vertical resolution to obtain a quotient and a remainder, both being integers. Some of the data lines of the printing job, which are formatted with a facsimile-based resolution, are then selected in block 204 before being generated, wherein the total number of the selected data lines is equal to the remainder. Next, all the data lines are repeatedly generated one-by-one through blocks 206 to 214. When the data line is detected to be the selected one in block 208, it will be repeatedly generated for "quotient+1" times in block 210, otherwise the data line will be repeatedly generated for "quotient" times in block 212.

Steps 206 to 212 keep going until the last data line is processed and then detected in block 214. Finally, the completely processed data lines can be directly printed or shown to users. As noted, the data line denoted in the invention is a horizontal data line, and duplicating the horizontal lines can modify the vertical resolution.

Figure 3:
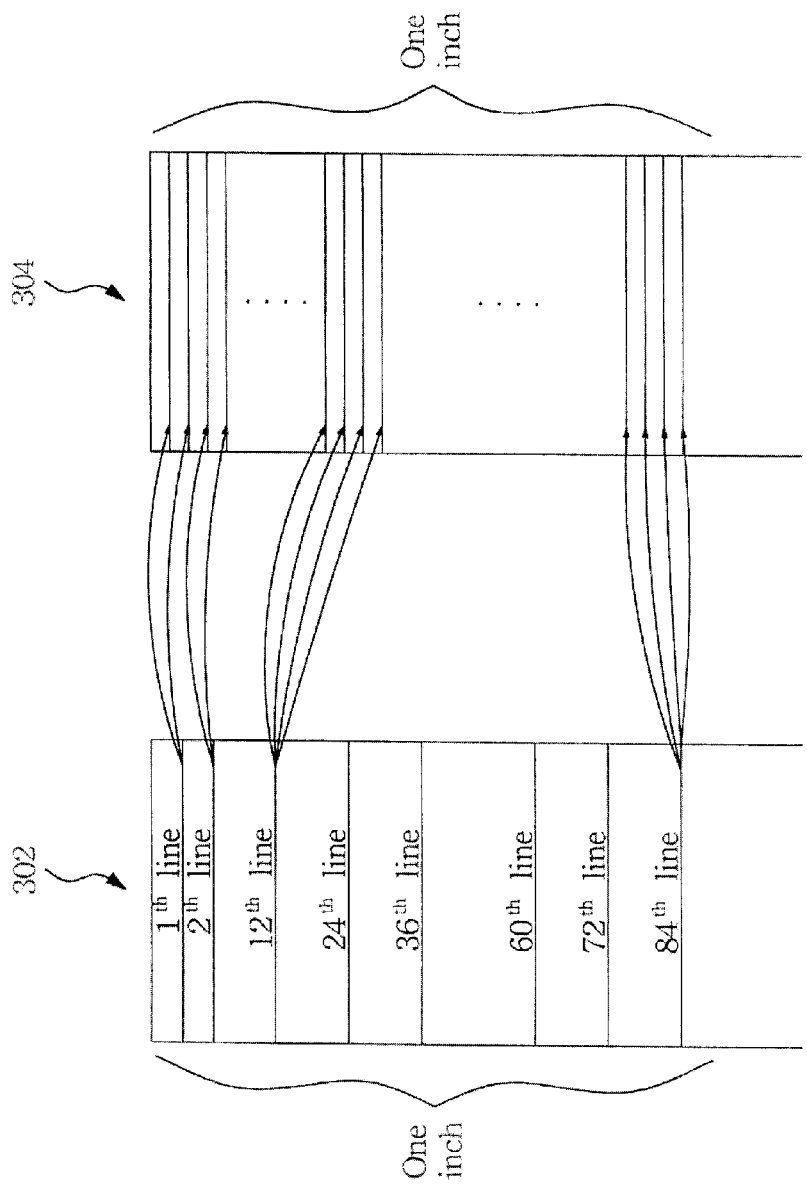
FIG. 3 is a diagram illustrating the duplicating process in the vertical direction for a printing action requested from a facsimile signal in the first embodiment according to the present invention.

FIG. 3 shows an example generated by using the flow of FIG. 2, wherein the facsimile-based and printer-based vertical resolutions are respectively 98 and 300 dpi. Because the quotient and remainder are respectively computed as 3 and 6 in block 202, 6 lines, for example, the $12^{th}$, $24^{th}$, $36^{th}$, $60^{th}$, $72^{nd}$, and $84^{th}$ lines shown in FIG. 3 are selected in block 204. Therefore, all the data lines are repeatedly generated for 3 times (i.e., "quotient" times) except the $12^{th}$, $24^{th}$, $36^{th}$, $60^{th}$, $72^{nd}$, and $84^{th}$ lines, which are repeatedly generated for 4 times (i.e., "quotient+1" times). As noted, the selected $12^{th}$, $24^{th}$, $36^{th}$, $60^{th}$, $72^{nd}$, and $84^{th}$ lines are selected for explanation purpose, and any data line of the printing job can be the candidate for repeated generated.

Figure 4:
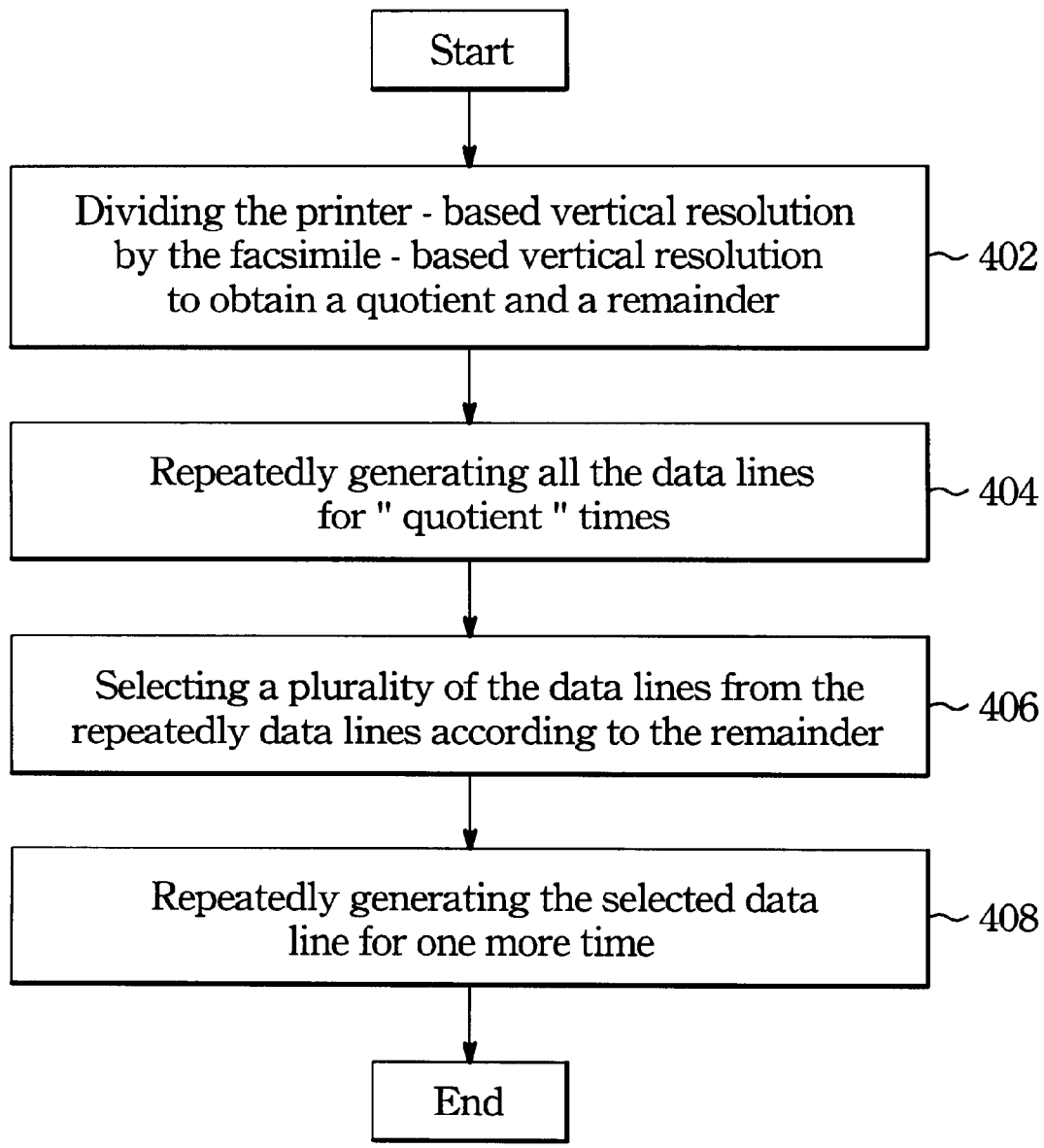
FIG. 4 is a flow diagram representative of the second embodiment of the printing method according to the present invention.

Referring to FIG. 4, another flow diagram representative of the second embodiment of the disclosed method is shown therein. At first in the block 402, the printer-based vertical resolution is also divided by the facsimile-based vertical resolution to obtain a quotient and a remainder, both being integers, too. All the data lines are then repeatedly generated for "quotient" times in block 402. Next, some data lines that their total number equals to the remainder are selected from the generated data lines in block 406, and the selected ones are generated once more in block 408 for completing the conversion process. Finally, the completely processed data lines also can be directly printed or shown to users as the first embodiment does. Moreover, as same as the first embodiment, the selected data lines can be randomly or fixedly selected from the data lines.

Figure 5:
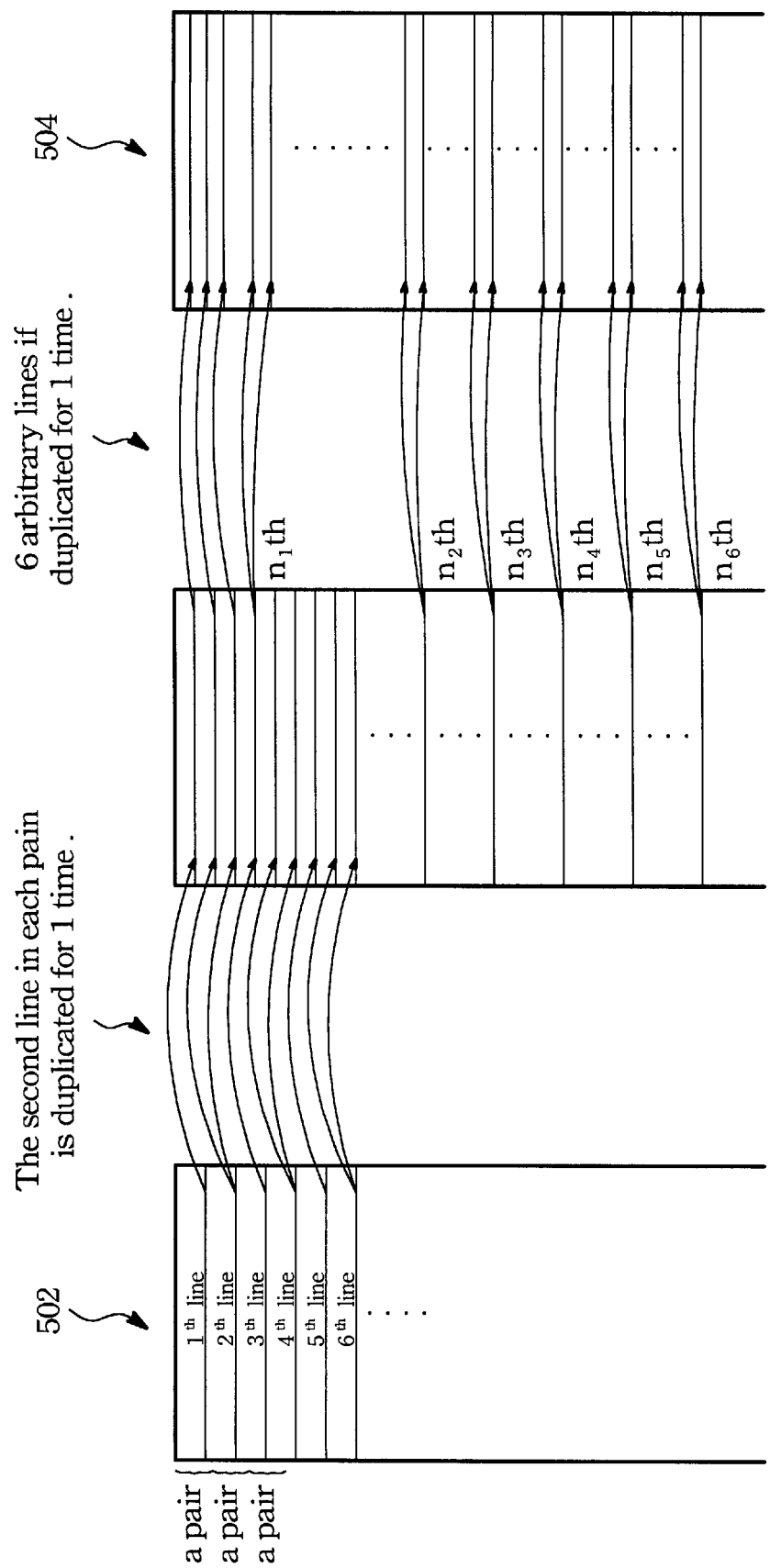
FIG. 5 is a diagram illustrating the duplicating process in the vertical direction for a printing action requested from a facsimile signal in the second embodiment according to the present invention.

FIG. 5 shows an example generated according to the second embodiment, wherein the facsimile-based and printer-based vertical resolutions are also 98 and 300 dpi, and the quotient and remainder are also respectively 3 and 6 obtained in block 402. All the data lines are firstly generated for 3 times (i.e., "quotient times") in block 404, and then 6 lines are selected from the generated data lines for generating one more time respectively in blocks 406 and 408. As noted, the image 504 is generated in block 404 and the image 506 is generated in block 408, wherein the $n_1^{th}$, $n_2^{th}$, $n_3^{th}$, $n_4^{th}$, $n_5^{th}$, and $n_6^{th}$ can be fixedly or randomly selected from the image 504. Obviously, errors are more evenly distributed than the conventional approaches because only those selected data lines having a greater repeat number than the others.

Please note that any kind of printers such as laser printers or ink-jet printers that require resolution conversions can employ the disclosed method at converting vertical resolutions. In other words, although the embodiments utilize the conversion from facsimile-based resolution to printer-based resolution; any kind of vertical resolution conversion can apply the disclosed method for obtaining an error evenly distributed image. Additionally, any kind of vertical resolution conversions, such as from facsimile-based resolution, e.g., 203.2×97.8 dpi to a printer-based resolution, e.g., 300×300, 600×600, or 1200×1200 dpi can be easily implemented by using the disclosed method. In fact, the disclosed method can be employed in any kind of devices used for printing or displaying visual information to users, for example, digital cameras, displaying devices such as LCD (Liquid Crystal Display), CRT (Cathode Ray Tube) systems, or furthermore, in any kind of devices that require resolution conversion from a lower to a higher vertical resolution.

Several advantages are offered by the disclosed method. Firstly, errors of the image generated by the above two embodiments are more evenly distributed than the conventional approaches. Secondly, the disclosed method can be implemented only by means of software with less computational cost. Additionally, the conversion of horizontal resolution can follow the related application "SYSTEM AND METHOD OF CONVERTING HORIZONTAL RESOLUTIONS FOR PRINTERS" that a phase lock loop (PLL) circuit is employed to generate two clocks for printing normal and sub-dots, respectively. Of course, by combining the two applications can overcome the disadvantages of the resolution conversions conventionally; however, those two applications can be independently performed without the aid of the other one.

As is understood by a person skilled in the art, the foregoing preferred embodiments of the present invention are illustrative of the present invention rather than limiting the present invention. It is intended to cover various modifications and similar arrangements included within the spirit and scope of the appended claims, the scope of which should be accorded the broadest interpretation so as to encompass all such modifications and similar structure.

What is claimed is:

1. A method for converting a vertical resolution of devices from a first resolution to a second resolution, wherein said first resolution is lower than said second resolution and said devices are used for showing visual information, said converting method comprising the steps of:

obtaining a relation between said first resolution and said second resolution, wherein said relation comprises a first number and a second number that both generated by using said first resolution and said second resolution;

selecting a plurality of data lines from a job for showing visual information, wherein a total number of said selected data lines equals to said second number;

repeatedly generating said data lines for said first number of times when said data lines are not selected; and repeatedly generating said data line for a third number of times when said data lines are selected, wherein said third number is larger than said first number;

whereby said generated data lines are shown as visual information through said devices.

2. The method according to claim 1, wherein said relation is generated from dividing said second resolution by said first resolution to obtain a quotient and a remainder, wherein said first number is equal to said quotient and said second number is equal to said remainder.

3. The method according to claim 2, wherein said third number is equal to an addition of said quotient and an integer one.

4. The method according to claim 1, wherein said job is printed by a laser printer or an ink-jet printer.

5. The method according to claim 1, wherein said first resolution is formatted on a facsimile-based resolution.

6. The method according to claim 5, wherein said facsimile-based resolution is 8×3.85 pixels/mm.

7. The method according to claim 1, wherein said second resolution is 300×300, 600×600, or 1200×1200 dpi.

8. A method of converting vertical resolution for a printing device, said converting method comprising the steps of:

obtaining a relation between a printing-based vertical resolution and an originally vertical resolution, wherein said relation comprises a first number and a second number that both generated by using said originally vertical resolution and said printing-based vertical resolution;

repeatedly generating all data lines of a printing job for said first number of times;

selecting a plurality of said generated data lines from said printing job, wherein a total number of said selected generated data lines equals to said second number; and repeatedly generating all said selected generated data lines for a third number of times.

9. The method according to claim 8, wherein said relation is generated from dividing said printing-based vertical resolution by said originally vertical resolution to obtain a quotient and a remainder, wherein said first number is equal to said quotient and said second number is equal to said remainder.

10. The method according to claim 8, wherein said third number is an integer one.

11. The method according to claim 8, wherein said printing device is a laser printer or an ink-jet printer.

12. The method according to claim 8, wherein said originally vertical resolution is formatted on a facsimile-based resolution.

13. The method according to claim 12, wherein said facsimile-based resolution is 8×3.85 pixels/mm.

14. The method according to claim 8, wherein said printing-based vertical resolution is formatted on a 300×300, 600×600, or 1200×1200 dpi (dot-per-inch).

15. A method of converting vertical resolution for a printing device, said converting method comprising the steps of:

dividing a printing-based vertical resolution by using an originally vertical resolution to obtain a quotient and a remainder;

selecting a plurality of data lines from a printing job, wherein a total number of said selected data lines is equal to said remainder;

repeatedly generating said data lines for a first number of times when said data lines are not selected, wherein said first number is equal to said quotient; and repeatedly generating said data lines for a second number of times when said data lines are selected, wherein said second number is equal to an addition of said quotient and an integer one.

16. The method according to claim 15, wherein said printing device is a laser printer or an ink-jet printer.

17. The method according to claim 16, wherein said originally vertical resolution is formatted on a facsimile-based resolution.

18. The method according to claim 17, wherein said facsimile-based resolution is 8×3.85 pixels/mm.

19. The method according to claim 15, wherein said printing-based vertical resolution is formatted on a 300×300, 600×600, or 1200×1200 dpi.

* * * * *